United States Patent

[11] 3,580,273

| [72] | Inventor | Ernest I. Schwarz<br>Middletown, Conn. |
|---|---|---|
| [21] | Appl. No. | 808,934 |
| [22] | Filed | Mar. 20, 1969 |
| [45] | Patented | May 25, 1971 |
| [73] | Assignee | The EIS Automotive Corporation<br>Middletown, Conn. |

[54] TWO-WAY CHECK VALVE
1 Claim, 5 Drawing Figs.

[52] U.S. Cl. ................................................ 137/493.2,
137/493.11, 137/525, 137/543.21, 137/218, 137/217
[51] Int. Cl. ...................................................... F16k 17/18
[50] Field of Search .......................................... 137/493.2,
493.1, 525, 218, 217, 543.21

[56] References Cited
UNITED STATES PATENTS

| Re24,664 | 6/1959 | Goepfrich | 137/493.1 |
| 1,976,849 | 10/1934 | Hewitt | 137/543.21 |
| 2,009,104 | 7/1935 | Carroll | 137/493.2X |
| 2,162,603 | 6/1939 | Bothe | 137/525X |
| 2,640,481 | 6/1953 | Conley | 137/525X |
| 3,065,761 | 11/1962 | Peras | 137/525X |

Primary Examiner—M. Cary Nelson
Assistant Examiner—R. B. Rothman
Attorney—Mc Cormick, Paulding & Huber

ABSTRACT: A two-way check valve comprising a diaphragm and metal disc unit for use particularly in association with the discharge port of a master cylinder for a vehicle-braking system. Flow outwardly of the cylinder in the braking stroke is accommodated through the disc and diaphragm while flow around the unit is prevented, and flow inwardly of the cylinder during the return stroke is accommodated around the unit while flow through the unit is prevented.

Patented May 25, 1971

3,580,273

INVENTOR.
ERNEST I. SCHWARZ

BY McCormick, Paulding & Huber

ATTORNEYS

TWO-WAY CHECK VALVE

BACKGROUND OF THE INVENTION

This invention relates in general to two-way check valves and deals more particularly with two-way check valves of the type being used in brake master cylinders for motor vehicles or the like.

In the present structures as disclosed in Goepfrich U.S. Pat. No. Re. 24,664 very often the pressure of the return flow of fluid will lock the diaphragm web to the disc or cause it to stick so as to prevent or deter outward flow of fluid to the wheel cylinders, increasing braking time and distance.

The general aim of this invention is to provide means to prevent such locking or sticking of the diaphragm while nevertheless exhibiting qualities the same as or better than present structures.

SUMMARY OF THE INVENTION

In accordance with the present invention a two-way check valve is provided, for seating on a valve seat, inwardly of the discharge port of a brake master cylinder or the like. The two-way check valve has a disc member with one or more apertures outwardly of its center and an annular diaphragm member with a groove in its inner surface to receive the disc. The diaphragm is also provided with a web extending transversely of its outward annular portion adjacent the disc. The web has a central opening defined by an inwardly facing bead or lip which normally engages the disc in sealed relationship whereby to provide a space between the diaphragm web and the disc to prevent any locking or sticking of the web to the disc at the disc apertures.

DETAILED DESCRIPTION OF PREFERRED EMBODIMENT

Figure 1:
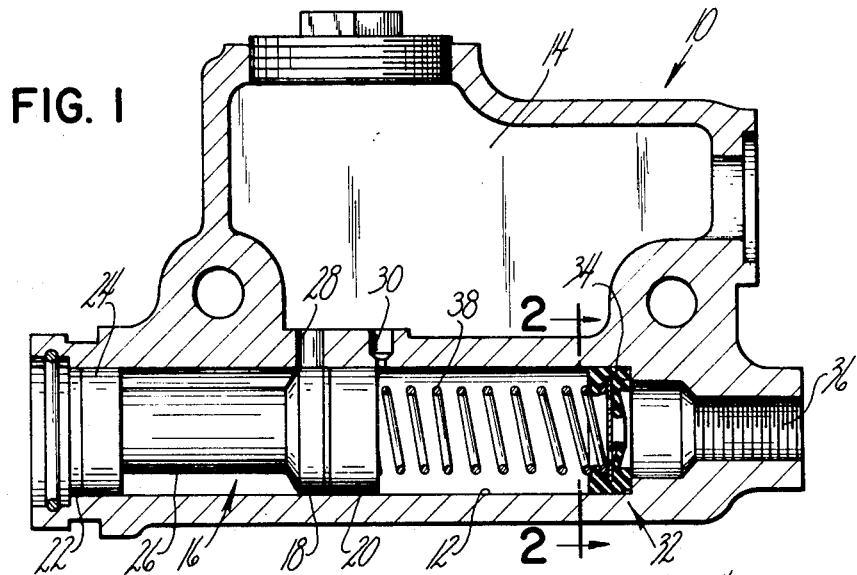
FIG. 1 is a longitudinal sectional view of a brake master cylinder embodying the present invention.

Turning now to the drawing and referring more particularly to FIG. 1, a brake master cylinder indicated generally at 10 consists of the usual casting having a cylindrical bore 12 and a reservoir chamber 14. A piston indicated generally at 16 is reciprocably mounted in the bore 12. The head 18 of the piston carries a rubber sealing cup 20 and the skirt 22 of the piston carries a rubber sealing ring 24. The piston 16 is operated by a brake pedal rod (not shown) and is moved toward the right to apply the brakes.

The annular chamber 26 between the head and the skirt or the piston is connected to the reservoir chamber 14 through supply port 28, which remains open throughout the brake-applying stroke of the piston. When the piston is in its retracted position, as shown, the lip of cup 20 is just behind a compensating port 30 which permits communication between reservoir chamber 14 and bore 12, ahead of the piston. When the piston moves forward on its pressure stroke, the lip of the seal 20 covers compensating port 30 to prevent pressure fluid from escaping to the reservoir 14.

The two-way check valve indicated generally at 32 is located at the front of the cylinder bore 12. An annular shoulder or counterbore 34 provides a valve seat for the valve 32 inwardly of the discharge port 36 and a coil spring 38 biases the valve 32 into a sealed relationship with the valve seat 34.

Figure 3:
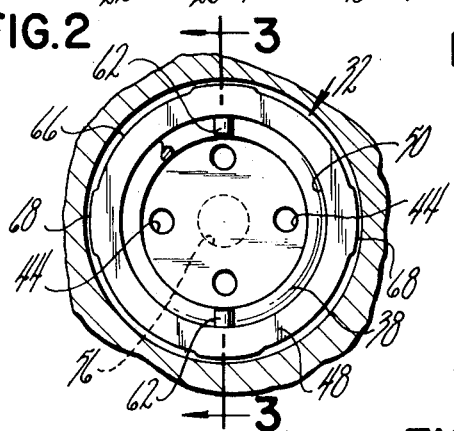
FIG. 3 is a sectional view of the device in its normal position taken generally along the line 3–3 of FIG. 2.

As best shown in FIG. 3, the two-way check valve 32 comprises a diaphragm member 42 and a disc member 40. The disc 40 is preferably metal and is flat and circular and has one or more apertures 44, 44 spaced radially outwardly from its center, but inwardly from its periphery. The diaphragm 42 is made of an elastomeric material, having an outwardly facing annular portion 46 adapted to engage the valve seat 34 in sealed relationship and also having an inwardly facing annular portion 48. The inwardly facing portion has a radially inwardly facing surface 50 performed with a groove 52 to receive the disc 40 between the inwardly and outwardly facing annular portions 46 and 48.

The diaphragm 42 is also provided with a web 54 extending transversely of its outwardly facing annular portion 46 and adjacent the disc 40. The web has a central opening 56 defined by an inwardly facing annular bead or lip 58 which normally engages the disc 40 in sealed relationship radially inwardly of the disc apertures 44, 44 whereby providing a space 60 between the disc 40 and the diaphragm web 54.

Figure 2:
FIG. 2 is an enlarged sectional view taken generally along the line 2–2 of FIG. 1 showing an end view of the two-way check valve.

As best shown in FIG. 2, the diaphragm 42 is also provided with one or more preformed fingers 62, 62 located on the radially inwardly facing surface 50 of the inwardly facing annular portion 48 of the diaphragm 32, to retain the spring 38 in engagement with the inwardly facing surface of the disc 40 between its periphery and its apertures 44, 44.

Figure 4:
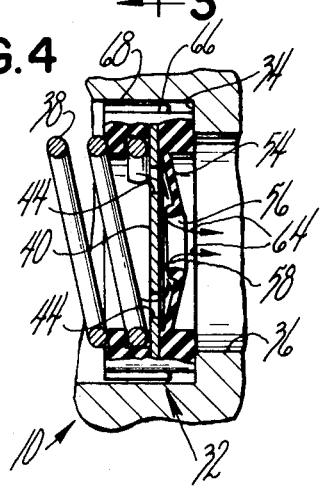
FIGS. 4 and 5 are sectional views similar to FIG. 3 illustrating the operation of the two-way check valve device during the pressure stroke and return stroke of the master cylinder.

In operation, when the piston 16 is moved on its pressure stroke, the fluid will pass through the apertures 44, 44, in the disc 40, into the space 60 forcing the web 54 outwardly thus breaking the seal between the disc 40 and the bead 58 permitting the fluid to pass through the aperture 56 and out the discharge port 36 as shown by the arrows 64 in FIG. 4.

Figure 5:
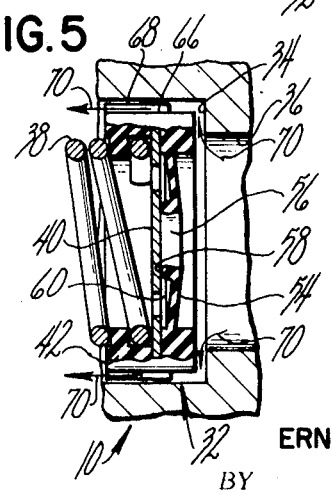

When the brake applying pressure is released, and the piston 16 returns to its retracted position, fluid will attempt to flow from the hydraulic lines back into the master cylinder 10. However, it will only be able to do so against the resistance of the spring 38. Since the line pressure holds the bead 58 of the web 54 in sealed relationship with the disc 40, fluid can return to the brake master cylinder only by unseating the two-way check valve from the valve seat 34. To guide the two-way check valve within the bore 12 during its unseating, on the release stroke of the master cylinder, the radially outer surface 66 of the diaphragm has a plurality of spaced outwardly projecting surfaces 68, 68 to act as guides and to permit fluid flow inwardly of the discharge port 36. The arrows 70, 70 in FIG. 5 show the path of fluid flow during the releasing stroke.

The retention of a positive pressure in the brake lines during the releasing stroke insures against leakage of air into the system.

From the foregoing description, it is obvious that the two-way check valve is easy to manufacture and assemble. Furthermore, by providing a space 60 between the disc 40 and the diaphragm web 54 the web 54 is prevented from coming into contact with the disc 40 thus preventing any change that the web 54 might become locked or stick to the disc 40 by the pressure of the fluid attempting to flow from the hydraulic lines back into the master cylinder.

I claim:

1. A two-way valve for a brake master cylinder or the like, which cylinder has a port and a valve seat surrounding and facing axially inwardly from said port, said check valve comprising a rigid disc having at least one aperture spaced radially outwardly from its center but radially inwardly from its periphery, an elastomeric diaphragm member having an axially outwardly facing annular portion adapted to engage said seat in sealed relationship and also having an axially inwardly facing annular portion, the radially outer surface of said axially inwardly facing annular portion having a plurality of radially spaced radially outwardly projecting surfaces to act as guides and to permit fluid flow from said port and around said diaphragm between said axially inwardly and outwardly facing annular portions, said diaphragm also being provided with a web extending transversely of its axially outwardly facing annular portion adjacent said disc, the said web having a central opening defined by an axially inwardly facing annular bead which normally engages said disc in sealed relationship radially inwardly of the disc aperture whereby to provide a space between the disc and diaphragm web, said web remaining in sealed relationship with said disc except when pushed axially outwardly by fluid flowing through said disc aperture and out of said port, and a spring means engaging the axially inwardly facing surface of said disc between its periphery and its aperture to urge said diaphragm toward engagement with said valve seat, the radially inner surface of the axially inwardly facing annular portion of said diaphragm having at least one preformed finger to retain said spring means in engagement with said disc whereby the diaphragm can be moved from engagement with said seat as a result of fluid pressure exerted axially inwardly from said port to permit flow around said diaphragm.